No. 815,240. PATENTED MAR. 13, 1906.
A. P. & C. H. WARNER.
FLEXIBLE SHAFT.
APPLICATION FILED MAR. 13, 1905.
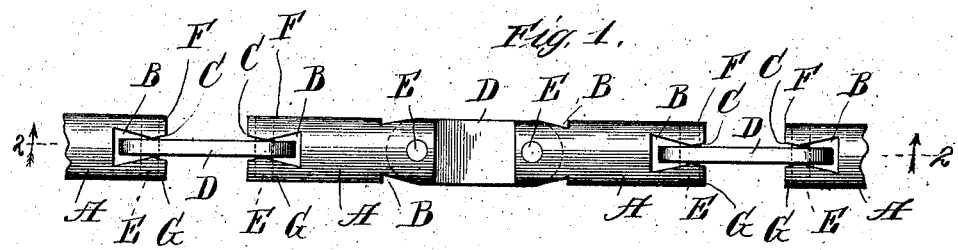
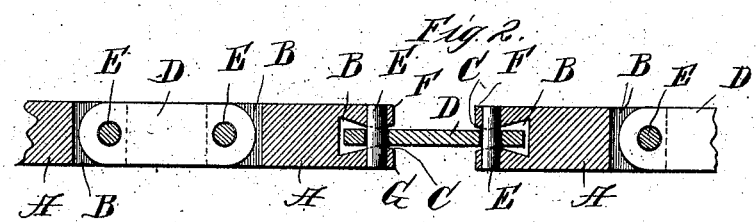
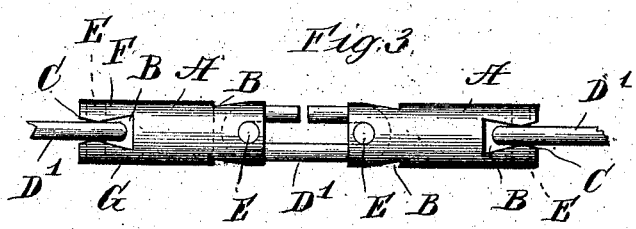
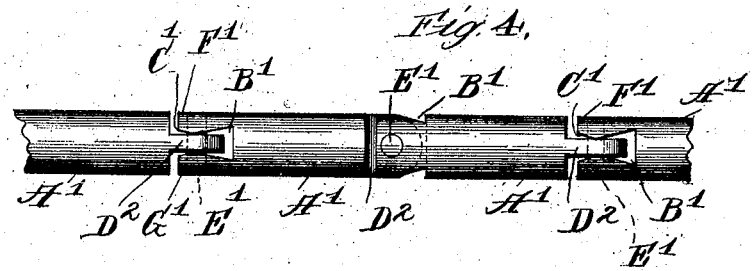
Witnesses
G. A. Rauberschmidt
Chas. H. Seem
Inventors,
Charles H. Warner
and Arthur P. Warner
By Brown & Darby
Attys.

UNITED STATES PATENT OFFICE.

ARTHUR P. WARNER AND CHARLES H. WARNER, OF BELOIT, WISCONSIN.

FLEXIBLE SHAFT.

No. 815,240. Specification of Letters Patent. Patented March 13, 1906.

Application filed March 13, 1905. Serial No. 249,733.

*To all whom it may concern:*

Be it known that we, ARTHUR P. WARNER and CHARLES H. WARNER, citizens of the United States, residing at Beloit, in the county of Rock and State of Wisconsin, have invented a new and useful Improvement in Flexible Shafts, of which the following is a specification.

This invention relates to flexible shafts.

The object of the invention is to provide a construction of flexible shaft which is simple, economical in manufacture, and efficient in operation, and wherein efficient flexibility in all directions, except in a rotative direction, is secured.

The invention consists, substantially, in the construction, combination, location, and arrangements of parts, all as will be more fully hereinafter set forth, as shown in the accompanying drawings, and finally pointed out in the appended claims.

Referring to the accompanying drawings, and to the various views and reference-signs appearing thereon, Figure 1 is a broken view showing a section of flexible shaft embodying the principles of our invention. Fig. 2 is a broken view, in longitudinal section, of the same on the line 2 2 of Fig. 1. Fig. 3 is a view similar to Fig. 1, showing another form of intermediate or connecting link and embraced within the spirit and scope of our invention. Fig. 4 is a view similar to Figs. 1 and 3, showing another modified form of flexible shaft embodying the spirit and scope of our invention.

In the practical operation of flexible shafts it is desirable to avoid the production of sharp corners in the structure of the shaft, so as to avoid undue wear of the shaft within the casing in which it is usual to mount such shaft. It is also exceedingly desirable to provide a construction of flexible shaft which while permitting efficient flexibility throughout the length of the shaft also prevents relative rotative movement of the links or parts thereof. The attainment of these desirable objects is among the special purposes of our present invention.

We have shown several forms of embodiment of our invention, and referring to Figs. 1 and 2 reference-sign A designates links, preferably of cylindrical contour and in the form of short sections of cylinders. In each end of each link or section A we form a transverse groove B. Each groove B is enlarged at the base thereof, so as to have considerable width, and each groove is also very slightly flared outwardly at the mouth thereof, as indicated at C. Adjacent ends of adjacent cylindrical link-sections A are pivotally connected by means of an intermediate coupling D through the medium of pivot-pins E, respectively passing through the side jaws formed by the grooves B and through the ends of the intermediate coupling D, the ends of the intermediate coupling D extending or projecting into the slots or openings B in the ends of the cylindrical sections A.

In practice and as shown in the drawings, but not necessarily, the slot B at one end of a section A is formed at right angles to the slot B at the other end of said section, the purpose of this special arrangement being to secure increased flexibility throughout the length of the shaft. The jaws F G, formed by the transverse slots B in the ends of the sections A, by reason of the slight outward flare C at the ends thereof and of the enlargement of the slot B at the base thereof are caused to approach each other on the inner surfaces thereof at the point where the pivot-pins E pass through. The effect of this construction is to afford efficient lateral or side bearing upon the intermediate couplings D to prevent relative rotation or displacement of said coupling and the link portions A, while at the same time the enlarged base of slots B and the slightly outward flare C of said slots permit a desirable range of lateral or bending deflection of the shaft, thereby securing the desired degree of flexibility of the shaft, but preventing rotation of the links or parts composing the shaft relatively to each other, and this we consider a most important and desirable feature of our invention.

In the form shown in Figs. 1 and 2 the intermediate coupling portions D are in the form of flat disks or plates having the ends thereof of rounded contour, and the width of the connecting-plates D corresponds to the diametrical dimension of the cylindrical link portions A. By this construction we produce an exceedingly simple, efficient, and inexpensive form of flexible shaft wherein a wide range of flexibility is secured, wherein efficient bearing of the shaft within the casing in which it works is secured, and wherein relative rotation of the parts composing the shaft is avoided.

In Fig. 3 we have shown a slightly-modified arrangement wherein instead of employing intermediate couplings of plate or disk form said couplings are in the form of wire links D', formed into loop shape and pivotally engaged at the ends thereof over the pins E, which project transversely across the proximate slotted ends of adjacent link portions A. The loop-shaped links thus serve to efficiently secure and maintain flexibility throughout the length of the shaft, while at the same time preventing by reason of the bearing of such intermediate coupling-links against the opposed surfaces of the jaws F G rotative movement of the parts composing the shaft relatively to each other.

In Fig. 4 we have shown a modified form of shaft embraced within the spirit and scope of our invention wherein the shaft is composed throughout the length thereof of solid cylindrical sections A'; but instead of forming a slot of enlarged dimension at the base thereof at each end of each cylindrical section, as in the constructions shown in Figs. 1, 2, and 3, we form a slot B' of enlarged dimensions at the base thereof and with a slightly outwardly flaring mouth C', forming the jaws F' G' at one end of each solid section, and we form a tongue D² at the opposite end of such section, the tongue D² of one section extending into the transverse slot or groove B' in the proximate end of the next adjacent section and pivotally connected therein by means of a transverse pin E', and in order to secure a desirable range of flexibility throughout the length of the shaft we prefer to form the tongue D² of a section in a plane at right angles to the transverse slot B' in the opposite end of such section, thereby securing the desired range of flexibility throughout the length of the shaft, while preventing rotative movement of the sections of the shaft relative to each other.

While we have shown and described a specific construction and arrangement of parts embodying the principles and the best form in which we at present contemplate applying the principles of our invention, we do not desire to be understood as limiting or confining ourselves to the exact and specific details of construction and arrangement shown and described, as variations and changes therefrom and in the details thereof may readily occur to persons skilled in the art and still fall within the spirit and scope of our invention.

What we claim as new and useful and of our joint invention, and desire to secure by Letters Patent, is—

1. A flexible shaft composed of a plurality of link-sections, one of each two adjacent parts throughout the length of the shaft having a transverse slot in the end thereof to receive the proximate end of the next adjacent section, said transverse slots being enlarged at the base thereof to permit limited relative lateral movement of the sections, a pivot-pin passing transversely through each slot and forming a pivot for the proximate end of the adjacent section, the walls of the slot serving to prevent relative rotative movement of said sections.

2. A flexible shaft, composed of parts pivotally connected at the proximate ends thereof, one of said parts having a transverse slot through the end thereof to receive the proximate end of the next adjacent part, the side surfaces of said adjacent part having direct bearing contact with the walls of said slot, said transverse slot being enlarged at the base thereof and slightly flared outwardly at the mouth thereof, and a pivot-pin passing through the jaws formed by each of said slots to form a pivotal connection of said parts.

3. A flexible shaft, composed of a plurality of parts hinged or pivoted together, each alternate part having a transverse slot through each end thereof, the slot at one end being at right angles to the slot at the other end, each slot having an enlarged base, the ends of the adjacent parts being adapted to be received within such slots, and a pivot-pin passing transversely through each slot to form the hinge or pivotal connection of said parts.

4. A flexible shaft, composed of links and intermediate couplings hinged or pivoted together at the ends thereof, the ends of each link having transverse slots therethrough to receive the ends of the intermediate couplings, the slots being enlarged at the base and slightly flared outwardly at the mouth thereof, and pivot-pins passing transversely through each slot to form the pivotal connection between the link and the proximate end of the adjacent intermediate coupling, the intermediate coupling bearing at the sides thereof directly against the inner wall of the reduced portion of the slot to prevent relative rotative movement of said link and coupling, while permitting free lateral movement.

5. A flexible shaft, composed of a plurality of cylindrical link-sections and intermediate couplings, each link-section having a transverse slot at each end thereof to receive the proximate end of an intermediate coupling, and pivot-pins passing transversely through the jaws formed by said slot and through the intermediate coupling to form the pivotal connection between these parts, said transverse slot having an enlarged base to permit of limited lateral movement of the parts, but preventing relative rotation thereof.

6. A flexible shaft composed of cylindrical link-sections and intermediate couplings, the ends of the cylindrical link-sections having transverse slots therethrough, the ends of the intermediate couplings being rounded, and pivot-pins passing transversely through said slots and rounded ends to form pivoted connections between the sections and couplings, said slots being enlarged at the bases thereof, the side surfaces of the intermediate couplings bearing directly against the walls of said slots.

7. A flexible shaft, composed of a plurality of cylindrical sections and intermediate couplings, each cylindrical section having a transverse groove or slot in each end thereof, said slots or grooves being arranged in right-angular relation with respect to each other and each having an enlarged base, the intermediate couplings being in the form of flattened plates, and pivot-pins passing transversely through said slots and forming means for pivotally connecting said link-sections and couplings.

In witness whereof we have hereunto set our hands, this 4th day of March, 1905, in the presence of the subscribing witnesses.

ARTHUR P. WARNER.
CHARLES H. WARNER.

Witnesses:
J. E. BURULL,
FANNIE E. WARNER.